United States Patent
Weigelt

(10) Patent No.: US 6,820,091 B2
(45) Date of Patent: Nov. 16, 2004

(54) DYNAMIC BUFFER ALLOCATION

(75) Inventor: Guenter Weigelt, Gaenfelden (DE)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 10/139,431

(22) Filed: May 6, 2002

(65) Prior Publication Data

US 2003/0037049 A1 Feb. 20, 2003

(30) Foreign Application Priority Data

May 11, 2001  (DE) .......................................... 011 11 520

(51) Int. Cl.[7] .............................................. G06F 7/00
(52) U.S. Cl. ........................... 707/102; 707/2; 707/100; 707/104.1
(58) Field of Search .................... 707/1–10, 100–104.1, 707/200–205; 709/212–213, 234, 200, 230, 232; 711/129, 100, 117, 170, 208, 202, 209, 206; 718/100–108; 370/229, 351; 345/4, 6, 91.2, 41, 72, 89, 84–85, 91

(56) References Cited

U.S. PATENT DOCUMENTS 4,509,119 A * 4/1985 Gumaer et al. ............. 711/136
5,506,986 A * 4/1996 Healy ......................... 707/204
5,784,698 A * 7/1998 Brady et al. ................. 711/171
6,064,805 A * 5/2000 McCrory et al. ........... 709/227
6,553,438 B1 * 4/2003 Coffman et al. .............. 710/52

* cited by examiner

*Primary Examiner*—Greta Robinson
*Assistant Examiner*—Linh Black
(74) *Attorney, Agent, or Firm*—William A. Kinnaman, Jr.

(57) ABSTRACT

An automatic tuning of the assignment of data sets of an application program to the buffer pools in the main storage is provided. Buffer pool usage statistics data are generated including a performance value for each of the data sets. The performance values of the data sets are examined for the existence of a data set reassignment criteria and a data set is reassigned to another buffer pool if a reassignment criteria is found. To determine a suitable buffer pool for receiving the data sets to be reassigned, a selection value for each of the buffer pools is generated by comparing the pool size with selected ones of the usage parameters. The selection values of the buffer pools are examined for the existence of a selection criteria that determines the buffer pool to which the data set is reassigned. The performance value examination and the data set reassignment are performed at restart time of an application program and may be repeated in predetermined time intervals during its runtime. In this manner an automatic tuning of the file-to-buffer assignment is performed and maintained irrespectively of a change in the system conditions.

22 Claims, 7 Drawing Sheets

| Data Set | PoolID | Traffic | I/O Operation | Buffer found | Hit Ratio | Threshold | Performance |
|---|---|---|---|---|---|---|---|
| DS | PID | Traf | IO | BF | HR | Thr | PERF |
| File1 | 1 | 50 | 300 | 300 | 1 | 1 | 0 |
| File2 | 1 | 100 | 10,000 | 1,000 | 0.1 | 1 | -90 |
| File3 | 2 | 1 | 90 | 10 | 0.11 | 1 | -1 |
| File4 | 2 | 10 | 10 | 90 | 9 | 1 | 80 |
| File5 | 3 | 100 | 1,000 | 6,000 | 6 | 2 | 400 |
| File6 | 3 | 2 | 10 | 90 | 9 | 1 | 16 |

| Data Set | Pool-ID | Traffic | I/O Operation | Buffer found | Hit Ratio | Threshold | Performance |
|---|---|---|---|---|---|---|---|
| DS | PID | Traf | IO | BF | HR | Thr | PERF |
| File1 | 1 | 50 | 300 | 300 | 1 | 1 | 0 |
| File2 | 1 | 100 | 10,000 | 1,000 | 0.1 | 1 | -90 |
| File3 | 2 | 1 | 90 | 10 | 0.11 | 1 | -1 |
| File4 | 2 | 10 | 10 | 90 | 9 | 1 | 80 |
| File5 | 3 | 100 | 1,000 | 6,000 | 6 | 2 | 400 |
| File6 | 3 | 2 | 10 | 90 | 9 | 1 | 16 |

FIG. 4

| Pool-Identification | Pool-Size | Data Throughput | Selection Value |
|---|---|---|---|
| PID | Sz | Traf | SUIT |
| 4 | 100 | 0.001 | 100000.000 |
| 3 | 1000 | 102.000 | 9.800 |
| 2 | 100 | 11.000 | 9.090 |
| 1 | 100 | 150.000 | 0.670 |

FIG. 5

DYNAMIC BUFFER ALLOCATION

BACKGROUND OF THE INVENTION

1. Field of the Invention

The invention relates to a method for accelerating data access to buffer pools in the main storage of a computer. The invention also relates to a corresponding apparatus and a corresponding program product.

2. Description of the Related Art

In computer systems which run a plurality of application programs, large amounts of data have to be accessed within short time periods. Each of the application programs has assigned a segment of virtual storage which provides a larger address space than the real main or primary storage of the computer system. On an operating system level, paging operations are performed by which portions of program code and data are transferred between a slower mass storage, for example, a magnetic disk or tape storage, and the primary storage which permits a fast access to its contents. The operating system uses paging operations to keep available in the primary storage the active code and the data to be accessed and to reduce the transfer of data to or from the mass storage to a minimum (see, for example, Deitel, 'Operating Systems', Addison-Wesley Publishing Company, Reading, Mass., USA, 1990, pp. 230–241).

Within virtual storage each application has assigned buffer pools for keeping available a plurality of data files for being processed by that application. The buffer pools may occupy a large portion of the main or primary storage and are able to store large amounts of data sets or files. The data in a data set or file is organized in a plurality of records of different length and are assigned to the buffer pools which are of different size. Application programs access data sets to receive or transmit data records. Thus, the number of buffer pools and their capacity determines the amount of data in terms of data records which are contained in the main storage at a certain point of time and are available for a direct and fast access.

For each application there are usually fewer buffer pools available then data records. It is desirable to have in the buffer pools large amounts of that data which is often used by an application. For this purpose, an amount of data records of an application is initially read from the mass storage and transferred to the buffer pools which belong to this application in the main storage. If a data record to be accessed by an application is not among those contained in one of the buffer pools, the application has to initiate a read operation in the mass storage to transfer a number of data records, including the one to be accessed, into the main storage. The storage resources of the buffer pools are limited compared with the number of data records of the files used by the application. To allow such transfer it may thus be necessary to move in advance other data records from a buffer pool to the mass storage in order to make space for the data records to be accessed. Transfer operations to or from the mass storage are much slower than a read or write operation in the main storage. The former takes milliseconds while the latter takes only a few nanoseconds. The time ratio between both may in fact be 1:100 to 1:1000 depending on the type of mass storage used. Repeated transfers for making available required data records in the main storage may thus greatly reduce the throughput of the computer system. It is therefore a task to keep transfers of data records between the main storage and the mass storage to a minimum. The same applies to related index information which is used for the access to data sets or files.

A successful access to a data set or a file in a buffer pool may in particular depend on the assignment of the data sets or files to the buffer pools which available for an application. A useful distribution of the files over the available buffer pools may increase the hit ratio of data set accesses considerably. This may be achieved through manual tuning of the system by using statistics data on the data transfer operations performed during a certain time period. Such statistics data are either available or will be generated for the tuning process. Based on the statistics data the assignment of certain data files to certain buffer pools is forced or prevented to achieve a balanced distribution of the files over the buffer pools. The tuning process is time consuming and in particular difficult if a large number of data sets is used. The result of the tuning process is static and valid only for the conditions which exist during the time period considered. These conditions may change rapidly so that repeated tuning may be required. However, the reason for long program running times remain often unnoticed by the user and thus no tuning is performed.

SUMMARY OF THE INVENTION

It is an object of the invention to provide computer systems with an accelerated access to data used during the execution of a plurality of applications.

According to another object of the invention the availability of the data used during the execution of a process or application in the main storage is improved and the need of time-consuming data transfers between the mass storage and the main storage is reduced.

In particular, it is an object of the invention to automatically optimize the balance of the data set or file distribution over the buffer pools to increase the number of data records which are available for a direct and fast access by the application.

According to the invention, as defined in the claims, buffer pool usage statistics data are generated including a buffer pool identification, an identification of a data set or file stored therein and a number of buffer pool usage parameters. A threshold value is specified for each data set for scaling selected ones of the usage parameters. For each of the data sets or files a performance value is generated by comparing the selected ones of the usage parameters with the threshold value of the data set. The performance values are examined for the existence of a data set reassignment criterion and the data set is reassigned to another buffer pool if a reassignment criterion is found. The data set reassignment criterion is preferably represented by a negative performance value.

To determine a suitable buffer pool for receiving the data sets to be reassigned, a selection value for each of the buffer pools may be generated by comparing the pool size with selected ones of the usage parameters. The selection values are used to select a suitable buffer pool by using a selection criteria included in the selection value that indicates the suitability of a buffer pool to receive additional data sets. The selection criteria is preferably represented by the magnitude of the selection value.

The checking of the performance values and the data set reassignment are performed at restart time of an application program and may be repeated during the runtime of the application program after predetermined time intervals have expired. In this manner an automatic tuning of the data set-to-buffer assignment is performed at restart time of an application and repeatedly during the runtime of the application so that a change of the system conditions may be covered by automatic tuning update operations.

BRIEF DESCRIPTION OF THE DRAWINGS

An embodiment of the invention is subsequently described with reference to drawings in which:

FIG. 4 is a buffer statistics table which is generated and used according to the invention;

FIG. 5 is an auxiliary statistics table that is used for a change of the buffer pool occupation;

DETAILED DESCRIPTION OF PREFERRED EMBODIMENTS OF THE INVENTION

The embodiment of the invention described herein relates to a computer system which comprises in its primary or main storage a plurality of buffer pools reserved for storing data which is used by application programs running on the computer system. The capacity of these buffer pools is limited in comparison with the number of data records in data sets used by application programs. It is thus often required to store the large majority of data in external storage such as magnetic disk storage. The computer system performs input/output (I/O) operations to transfer data files or parts of data files, such as data records, between the external storage and the main storage dependent on the usage of the data files by the application and also dependent on the storage space available in the buffer pools.

Figure 1:
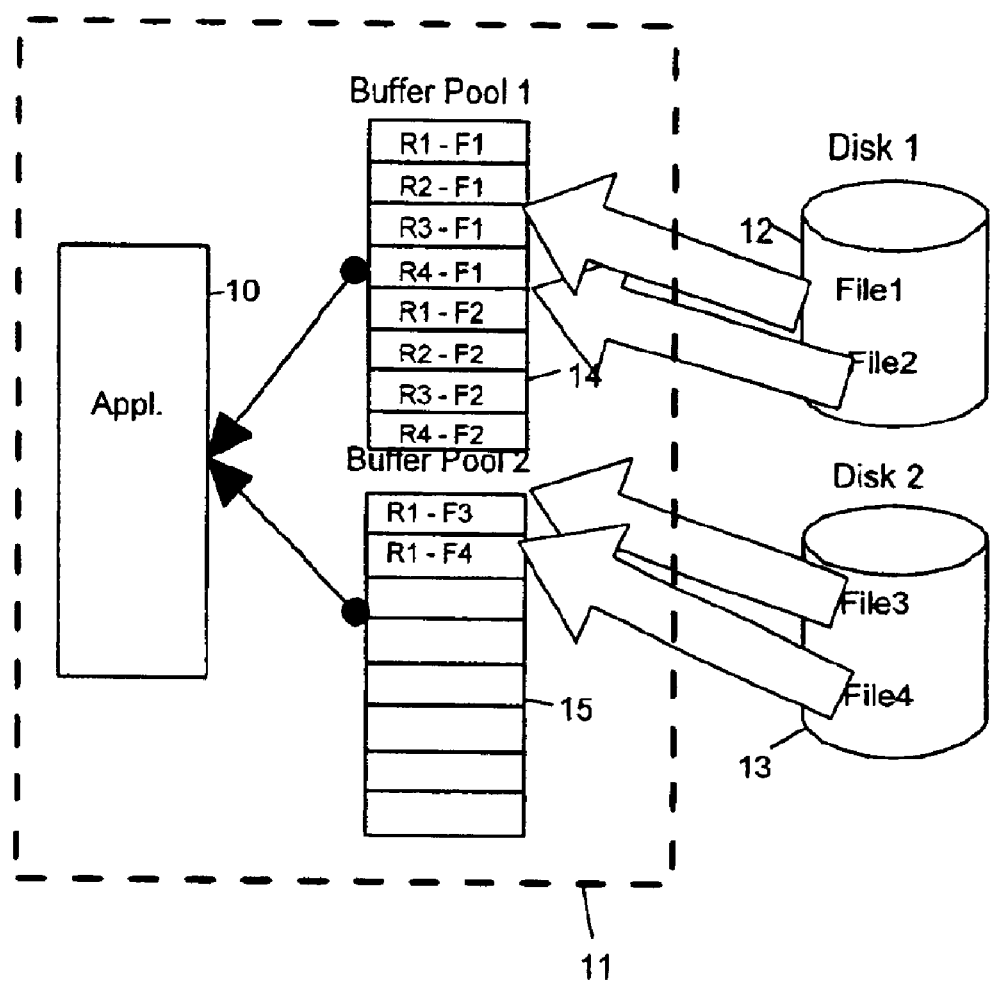
FIG. 1 is an example of a computer system comprising buffer pools in the main storage for data transfers between an application and disk storage.

FIG. 1 shows an example of a storage organization using main storage buffer pools for data of an application program 10. The buffer pools are allocated to portions of the main storage wherein also the application 10 is stored. The main storage may be a virtual storage 11 of the computer system which also comprises magnetic disk storage 12 and 13. Storage 11 contains two buffer pools 14, 15 which are assigned to store data records of four data files F1–F4 of application 10. FIG. 1 shows the main storage 11 in a state where buffer pool 14 contains records R1–R4 of a file F1 and records R1–R4 of a file F2. Buffer pool 15 only contains record R1 of a file F3 and record R1 of a file F4 while the larger part of buffer pool 15 is not used. The application 10 is reading data records from files F1, F2, F3 and F4.

Additional data records of the files F1 and F2 are stored on disk 12 and additional data records of the files F3 and F4 are stored on disk 13. If the application 10 requires data records which are not contained in the buffer pools 14, 15, a read operation on disk 12 or 13 has to be performed to transfer those data records to the buffer pools 14 or 15. If there is no more storage space in a buffer pool a disk write operation is required to transfer data records from the buffer pools to the disk 12 or 13 in order to free buffer pool storage space. Compared with read and write operations in the buffer pools, disk read or disk write operations are slow. A large number of disk read and write operations thus reduces the efficiency to the computer system.

Figure 2:
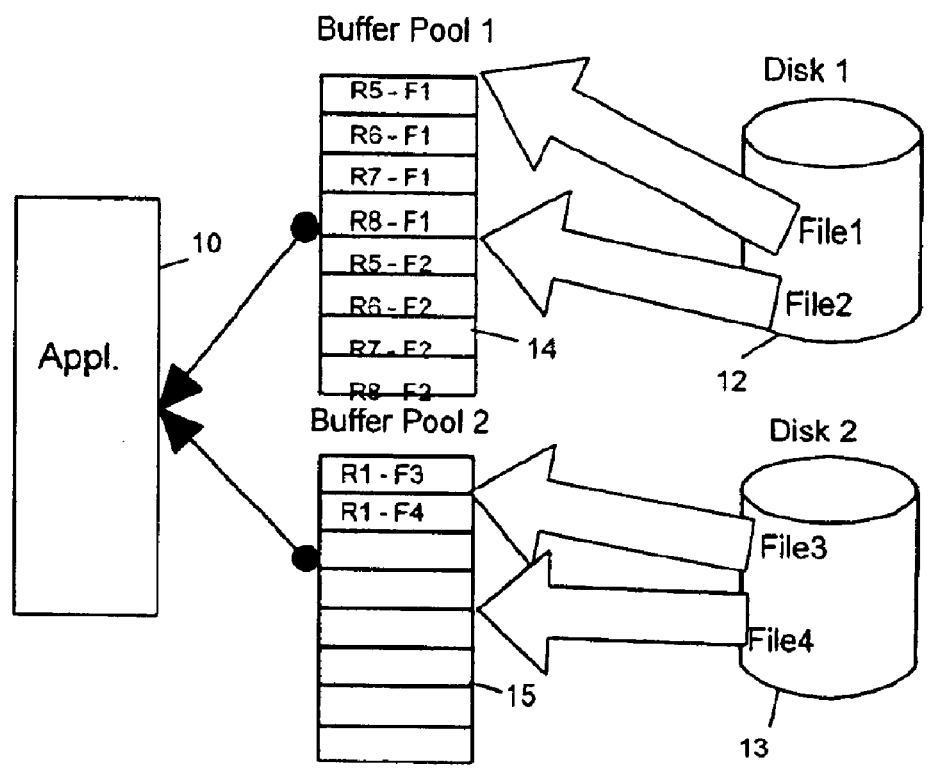
FIG. 2 is the example of FIG. 1 in a state some time period later.

FIG. 2 shows the main storage 11 in a state some time period later, which may last, for example, some seconds. Buffer pool 14 contains now records R5–R8 of the file F1 and records R5–R8 of the file F2. The contents of buffer pool 15 have not changed and buffer pool 15 still contains the records R1 of the files F3 and F4. This means that eight disk write operations were required to free buffer pool 14 accordingly, and eight disk read operations were required to transfer the required data records from disk 12 into buffer pool 14. On the other hand, buffer pool 15 does not show any change of its contents and a large portion of its storage space is still not used.

Figure 3:
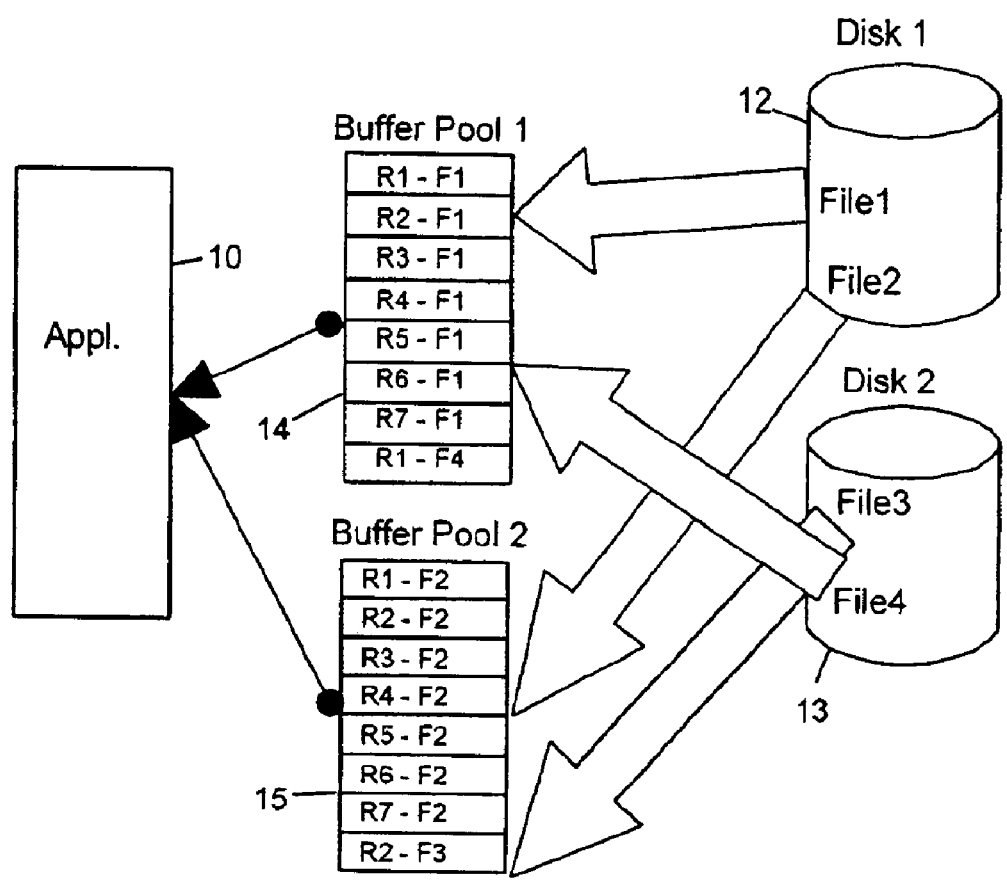
FIG. 3 is the example of FIG. 1 after a manual optimization of the buffer pool usage has been performed.

In this example, there is an imbalance in the use of buffer pools 14 and 15 which may be avoided by manual tuning based on buffer pool usage statistics. Such statistics may already exist or are generated for this very purpose. By the manual tuning the assignment of certain files to certain buffer pools will be forced or prevented. FIG. 3 shows for the example of FIGS. 1 and 2 a buffer pool occupation as result of a manual tuning. Buffer pool 14 now contains data records R1–R7 of file F1 and record R1 of file F4 and buffer pool 15 contains data records R1–R7 of file F2 and record R1 of file F3. Buffer pool 14 is now mainly assigned to file F1 and contains only one record of another file which is record R1 of file F4. Buffer pool 15 is now mainly assigned to file F2 and contains only record R1 of file F3. The result of the tuning is thus that the occupation of the buffer pools 14 and 15 is better balanced and the number of data records of files F1 and F2 which are available in the buffer pools at the same point of time has been increased so that fewer disk access operations are required.

As an example of the practice of this invention, Table 1 shows short section of buffer pool usage statistics:

TABLE 1

| BUFFER SIZE (IN BYTES) | NUMBER OF BUFFERS IN POOL | SUCCESSFUL BUFFER ACCESS | NUMBER OF DISK READS |
| --- | --- | --- | --- |
| 512 | 100 | 2,309,492 | 216,769 |
| 1024 | 200 | 3,364,374 | 767,830 |
| 2048 | 200 | 6,063,697 | 505,793 |
| 512 | 100 | 2,309,492 | 216,769 |
| 1024 | 200 | 3,364,374 | 767,830 |
| 2048 | 200 | 6,063,697 | 505,793 |
| 4096 | 200 | 8,732,875 | 2,483,957 |
| 8192 | 100 | 4,649,802 | 602,309 |

This table may be the result of observing the usage of a number of puffer pools over a period of 16 hours. It shows that the behavior of the system is dependent on the number of buffers included in a buffer pool and the size of the buffers. Thus, 200 buffers each having a size of 2048 bytes show 6,063,697 successful buffer access operations and require only 505,793 disk access operations. On the other hand, 200 buffers having a size of 4096 bytes results in 8,732,875 successful buffer access operations and requires 2,483,957 disk access operations.

TABLE 2

| FILE NAME | DATA BUFFER SIZE | INDEX BUFFER SIZE |
| --- | --- | --- |
| MSNMSG | 2048 | 4096 |
| PPSXEDT | 4096 | |
| DVTAB01 | 4096 | 512 |
| D#FAB01 | 512 | 2048 |
| D#TST01 | 4096 | |
| DSSTA01 | 512 | 8192 |

In Table 2 a shortened example of 6 files out of 185 files is shown with regard to the buffer size assigned to the files listed. The buffer size depends on the size of the records of the data files. The record size depends on the application and the operating system used and may have a range between some hundreds and many thousands of bytes. Some of the files have in addition associated index data which is assigned to separate buffers. An access to data records of such files requires a previous access to the associated index data. Thus, a tuning has to be extended to both the data buffers and the index buffers.

| Data Set | DS | file name (a file is herein also called data set); |
| Pool-ID | PID | buffer pool identification; |
| Traffic | Traf | data accesses to the file per time period (traffic), this parameter has to be adapted according to the operating systems used; it may, for example, represent the data accesses per second; |

TABLE 3

| FILE NAME | GET | GETUPD | BROWSE | ADD | UPDATE | DEL | EXCP DATA | EXCP DATA |
|---|---|---|---|---|---|---|---|---|
| MSNMSG | 493553 | 1328 | 12893 | 34 | 1328 | 1 | 33934 | 26288 |
| PPSXEDT | 11032 | 32475 | 0 | 0 | 34475 | 0 | 50982 | 0 |
| DVTAB01 | 0 | 0 | 0 | 0 | 0 | 0 | 0 | 0 |
| D#FAB01 | 28104 | 0 | 7122 | 0 | 0 | 0 | 16207 | 9078 |
| D#TST01 | 312037 | 0 | 32 | 32 | 0 | 0 | 90262 | 49829 |
| DSSTA01 | 0 | 112 | 0 | 170 | 0 | 112 | 549 | 408 |

Table 3 shows a small section of file statistics for 6 files out of 514 files after a manual tuning was performed. The columns of this table are designated as follows:

| GET | the number of read operations in the buffer pool; |
| GETUPD | the number of read and write operations in the buffer where the data read was modified (updated); |
| BROWSE | the number of sequential data record read operations within a file; |
| ADD | the cases where additional data was added to a file; |
| UPDATE | the cases where the contents of the file were updated; |
| DEL | the cases where portions of a file were deleted; |
| EXCP DATA | the number of accesses to the disk storage to read or write data; |
| EXCP INDEX | the number of accesses to the disk storage to read or write index data. |

As a result of the manual tuning of the assignment of files to the buffer pools, the files with a high traffic such as files MSNMSG and D#TST01 show a large number of hits where the data accessed is found in the buffers and only a much smaller number of slow disk access operations. The file PPSXEDT, however, still requires a high number of disk access operations.

In practice, a successful manual tuning for applications which use a large number of files is difficult and time consuming. The results of manual tuning are limited and static since they remain valid only for a period of time during which the conditions are not substantially changed. The result may soon be invalid due to a change of the usage of files. Such change may have the consequence of long program run times by increased numbers of slow disk access operations, and often the reasons of the reduced efficiency are not recognized and thus a new tuning is not made.

According to the invention an automatic tuning of the buffer usage is provided. Statistics of the buffer occupation and of the hit ratio are evaluated. Control criteria are derived to determine or change the assignment of a file to a specific buffer pool.

FIGS. 4 and 5 represent an example of a statistics table 40 and an auxiliary table 50 as may be used by the invention to determine the buffer pool usage and to control the assignment of the files to the buffer pool. The table 40 of FIG. 4 serves to determine the buffer pool usage per file. The fields of this table are explained as follows:

-continued

| I/O Operation | IO | external data accesses, i.e. input/output operations such as, for example, disk read and/or write operations; |
| Buffer found | BF | the data to accessed have been found in the buffer pool (hit), thus no external data access is required; |
| Hit Ratio | HR | hit ratio BF/IO which is the ratio between the successful buffer accesses and external data accesses; |
| Threshold | Thr | a threshold value of the hit ratio, this threshold value is set by the user; |
| Performance | PERF | a performance value, i.e. a buffer pool usage criteria for maintaining or modifying a file-to-buffer assignment; in the example shown a negative sign of the performance value serves as control signal for a reassignment. |

Table 40 indicates for File2 a strong traffic and a large number of external data access or I/O operations while the BF value is much lower. This results in a low hit ratio and a negative performance as shown in field 42 of column 41. Accordingly, the statistics of FIG. 4 indicate that the buffer assignment of File2 has to be changed. The performance may be expressed more general by the formula:

$$PERF = ((HR - Thr) * Traf)$$

As may be seen from this formula, by modifying the threshold value Thr, the influence of the hit ratio HR on the generation of the control criteria may be increased or reduced. The threshold value Thr can thus be used to make the system more or less sensitive to achieve a higher or lower tuning level.

The auxiliary table 50 shown in of FIG. 5 serves to determine the modified buffer pool assignment after it has been determined that an reassignment is required. The fields of this table are explained as follows:

| Pool-Identification | PID | identification of the buffer pool, |
| Pool-Size | Sz | size of the buffer pool, i.e. the number of data buffers available in a buffer pool, |
| Data Throughput | Traf | the data throughput in the buffer pool per time unit, this parameter has to be adapted according to the operating systems used; it |

-continued

| | | |
|---|---|---|
| Selection Value | SUIT | may, for example, represent the data accesses per second, represents a selection value to determine the data buffer pool to which the file may be assigned; a great value of a buffer pool indicates that the buffer pool is able to receive new files while a small value indicates that the buffer pool is less or not suited for receiving new files. |

In the table of FIG. 5 buffer pool 4 has the lowest traffic value in relationship to its size, which results in the largest selection value as shown in field 52 of column 51. Buffer pool 4 is thus selected for receiving File2 from the table of FIG. 4. These relationship may be expressed more general by the formula:

$$SUIT=Sz/Traf$$

By applying a check to all SUIT values for identifying the greatest SUIT value, the actual selection value may be determined.

The statistic tables 40 and 50 as shown in FIGS. 4 and 5 are generated during the operation of an application program such as the application 10 of FIG. 1. The majority of data stored in the table format of FIGS. 4 and 5 is the same as the usage statistic data which is generated in conventional systems for the manual tuning described above with reference to the Tables 1–3. Storing these data in the tables according to FIGS. 4 and 5 is just an extension of the existing statistic log. At the end of a session, when the operation of the application is terminated, the statistic tables are stored in a repository file in an external storage for being used when the application is started again. The repository file thus represents an up-to-date log of the buffer pool usage by the data and index files of an application.

Figure 6:
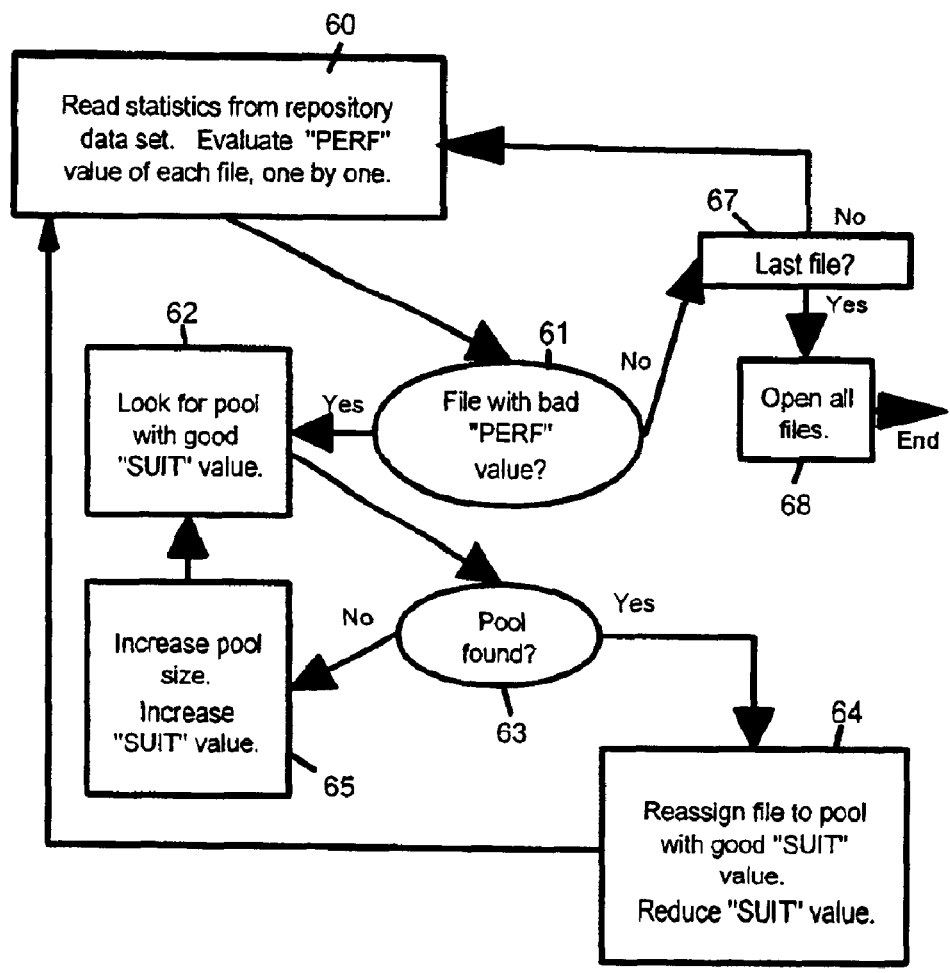
FIG. 6 is a flow diagram of an automatic optimization of the buffer pool usage according to the invention.

FIG. 6 shows the operation of an embodiment of the invention. The operation starts before the definition of the buffer pools for an application program is performed. Step 60 reads the existing statistic tables from the repository file in the external storage which may be, for example, disk 12 of FIG. 1. At an initial start of an application these tables are empty. For the subsequent description it is assumed that the tables already contain statistical data which was generated during the previous use of the application. Step 60 also performs an evaluation of the performance parameters PERF contained in the column 41 of table 40 in FIG. 4 to identify those which have the lowest value, which serves as a reassignment criterion. In the example of FIG. 4, the lowest PERF value is the value −90 in field 42, which belongs to File2. Step 61 determines whether there is a file with a bad PERF value, i.e. a PERF value which indicates that a reassignment of that file to another buffer pool is required. If this is the case step 62 looks for a pool having a good SUIT value. For this purpose a check is applied applying to all SUIT values in column 51 of FIG. 5 to identify the greatest SUIT value, which serves as a selection value. In the example of FIG. 5 the selection value would be the value 1000000.000 in field 51 of buffer pool 4. If step 63 determines that a pool having such "good" SUIT value was found, step 64 reassigns the file identified in step 61 to the buffer pool having the good SUIT value and also reduces the SUIT value of that pool to indicate that after the reassignment this buffer pool is less suitable for receiving further files than it was before the file reassignment was performed. If on the other hand, step 63 indicates that there is no buffer pool available to receive the file identified in step 61, the pool size of the pool with the worst SUIT value identified in step 62 is increased in step 65, which also increases the SUIT value of that pool to indicate a more suitable buffer pool for a file reassignment according to the increased buffer pool. Thereafter steps 62 and 63 are repeated and, in consequence, also step 64 or 65.

If step 61 indicates that the file investigated does not have a bad PERF value, step 67 determines whether this file is the last file of all files to be considered. If this is not the case, step 60 and in consequence all other steps are repeated. Otherwise step 68 is performed, which opens all files for being used by the application and thereby terminates the initial tuning.

The process according to FIG. 6 results in an initial optimization of the buffer usage. The application starts with the file assignment to the buffer pools reached by the initial tuning. During the execution of the application the conditions may change, for example, by an increase of the number of files used or by using different files. The initial tuning may thus be no longer appropriate and an update tuning is required. This may be automatically done after a certain time period and may be repeated after another time period.

Figure 7:
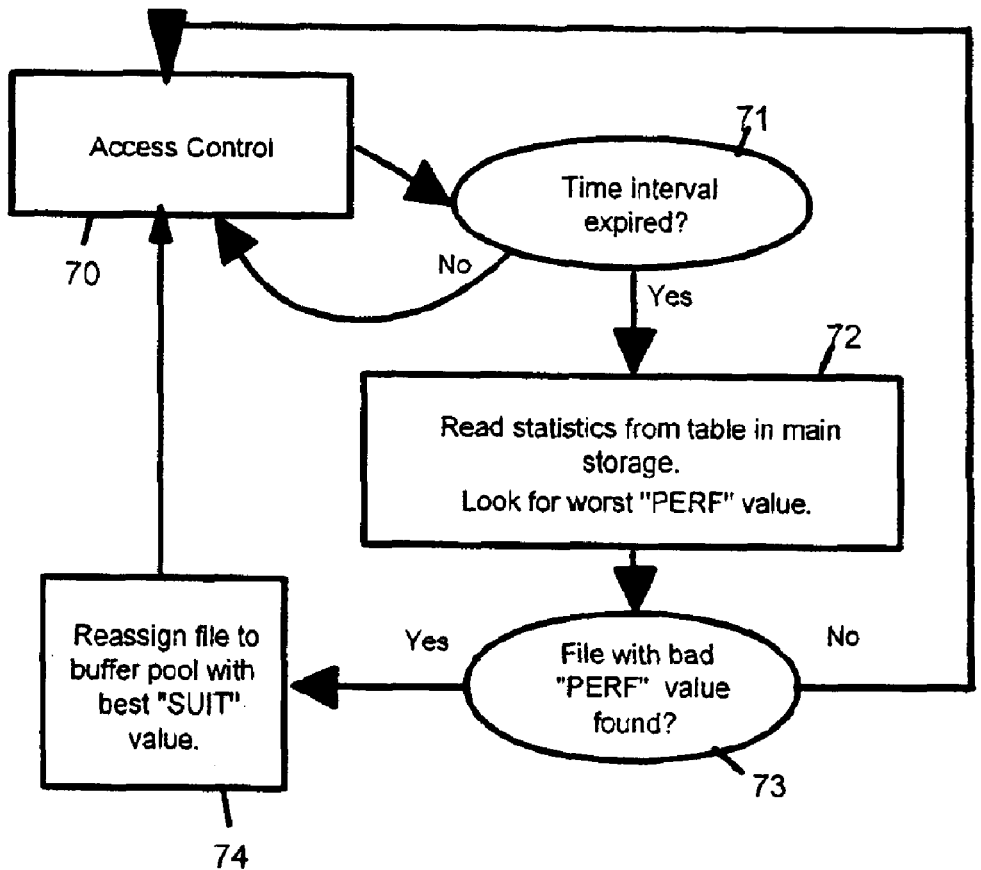
FIG. 7 is a flow diagram of a dynamic mode to automatically optimize the buffer pool usage according to the invention.

FIG. 7 shows a time-controlled dynamic optimization of the buffer usage by the files of an application which is performed during the runtime of that application. Under the control of the application an access control 70 unit performs an access to the files of the application in the main storage of a computer system using a known file access method. The access control 70 repeatedly initiates a step 71 to determine whether a predetermined time interval is expired. If step 71 indicates that the time interval expired, a step 72 becomes active to read the statistics data from the tables of FIGS. 4 and 5, which are stored in the main storage 11. Step 72 also looks for the worst performance value PERF as described above with reference to FIG. 6. Step 73 determines whether there is a file which shows a reassignment criterion represented by a bad PERF value. If this is the case, a step 74 is performed which reassigns the file identified in step 72 to the pool indicated by the selection value which is represented by the best SUIT value. Thereafter, the SUIT value of that buffer pool is reduced accordingly. The control is then given back to the access control 70. Also if step 73 indicates that none of the files indicates a bad PERF value, the control is transferred to the access control 70, which then again asks in step 71 whether the predetermined time interval is expired. If this applies, the automatic tuning process is performed again. In this manner a repeated tuning of the file-to-buffer assignment is performed so that any change in conditions that may occur during the execution of the application results in the previous tuning being updated to cover the change in conditions and maintain the system in an state where the assignment of the files to the buffer pools owned by an application is optimized.

While the invention is described with reference to preferred embodiments of the invention, modifications or other implementations of the invention are within the scope of the invention as defined in the claims.

What is claimed is:

1. A method for accelerating data access in a main storage of a computer system which runs a plurality of applications, each application having a set of buffer pools in the main storage to store data records of data sets used by the application, comprising the steps of:
   (a) generating buffer pool usage data for each of said data sets including a set of usage parameters;
   (b) specifying a threshold value for each of said data sets for scaling a selected one of said usage parameters;

(c) generating a performance value for each of said data sets by comparing the selected usage parameter generated for the data set with the threshold value specified for the data set; and (d) checking the performance value generated for each of said data sets to determine whether it satisfies a data set reassignment criterion and reassigning each data set having a performance value satisfying said reassignment criterion to another buffer pool.

2. The method of claim 1 in which said buffer pool usage data includes a buffer pool identification and an identification of a data set stored therein.

3. The method of claim 1 in which said usage parameters include a buffer pool hit ratio and wherein the performance value for a data set is generated by multiplying the difference between the buffer pool hit ratio for the data set and the threshold value specified for the data set by a traffic value specified for that data set.

4. The method of claim 1 in which said data set reassignment criterion comprises a negative performance value.

5. The method of claim 1 in which the generating and specifying steps (a)–(c) are performed during runtime of an application program and the checking and reassigning step (d) is performed at restart time of an application program.

6. The method of claim 1 in which each of said buffer pools has a certain size, said method further comprising the step of:

(e) generating a selection value for each of said buffer pools by comparing the size of the buffer pool with a selected one of said usage parameters, said selection value indicating the suitability of a buffer pool to receive additional data sets;

said checking and reassigning step (d) further comprising the step of:

(f) selecting a buffer pool by using a selection criterion based upon said selection values and reassigning each data set having a performance value satisfying said reassignment criterion to the selected buffer pool.

7. The method of claim 6 in which the selection value for each of the buffer pools is generated by dividing the buffer size by a data throughput parameter.

8. The method of claim 6 in which the selection criterion comprises having a selection value of a certain magnitude.

9. The method of claim 6 in which the selection criterion comprises having a greatest selection value of all selection values generated for said buffer pools.

10. The method of claim 6 in which the generating step (e) is performed during runtime of an application program and the checking and reassigning step (d) is repeatedly performed after predetermined time intervals have expired during the runtime of the application program.

11. The method of claim 6, further comprising the step of modifying a selection value after its use for selecting a buffer pool for receiving a data set to be reassigned.

12. A computer program comprising program code means for performing all the steps of claim 1 when said program is run on a computer system.

13. A computer program product comprising program code means stored on a computer readable medium for performing all the steps of claim 1 when said program is run on a computer system.

14. Apparatus for accelerating data access in a main storage of a computer system which runs a plurality of applications, each application having a set of buffer pools in the main storage to store data records of data sets used by the application, comprising:

(a) means for generating buffer pool usage data for each of said data sets including a set of usage parameters;

(b) means for specifying a threshold value for each of said data sets for scaling a selected one of said usage parameters;

(c) means for generating a performance value for each of said data sets by comparing the selected usage parameter generated for the data set with the threshold value specified for the data set; and (d) means for checking the performance value generated for each of said data sets to determine whether it satisfies a data set reassignment criterion and reassigning each data set having a performance value satisfying said reassignment criterion to another buffer pool.

15. The apparatus of claim 14 in which said buffer pool usage data includes a buffer pool identification and an identification of a data set stored therein.

16. The apparatus of claim 14 in which said data set reassignment criteria comprises a negative performance value.

17. The apparatus of claim 14 in which the generating and specifying means (a-)–(c) are active during runtime of an application program and the checking and reassigning means (d) is active at restart time of an application program.

18. The apparatus of claim 14 in which each of said buffers pools has a certain size, said apparatus further comprising (e) means for generating a selection value for each of the buffer pools by comparing the size of the buffer pool with a a selected one of said usage parameters, said selection value indicate the suitability of a buffer pool to receive additional data sets;

said checking and reassigning means (d) further comprising:

(f) means for selecting a buffer pool by using a selection criterion based upon said selection values and for reassigning each data set having a performance value satisfying said reassignment criterion to the selected buffer pool.

19. The apparatus of claim 18 in which the selection criterion comprises having a selection value of a certain magnitude.

20. The apparatus of claim 18 in which the selection criterion comprises having a greatest selection value of all selection values generated for said buffer pools.

21. The apparatus of claim 18 in which the generating means (e) is active during runtime of an application program and comprising timer means for activating the checking and reassigning means (d) after a predetermined time interval has expired during the runtime of the application program.

22. The apparatus of claim 14, further comprising means for modifying a selection value after its use for selecting a buffer pool for receiving a data set to be reassigned.

* * * * *